US007774105B2

(12) United States Patent
Robb et al.

(10) Patent No.: US 7,774,105 B2
(45) Date of Patent: *Aug. 10, 2010

(54) SYSTEM AND METHOD FOR AIRCRAFT INTERIOR ANNUNCIATOR

(75) Inventors: Calsee N. Robb, Seattle, WA (US); Heidi J. Kneller, Bellevue, WA (US); William A. Harkness, Everett, WA (US); Buddy L. Sharpe, Mill Creek, WA (US); James P. Schalla, Edmonds, WA (US); Bethany L. Franko, Seattle, WA (US); Kwun-Wing W. Cheung, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 310 days.

This patent is subject to a terminal disclaimer.

(21) Appl. No.: 11/927,545

(22) Filed: Oct. 29, 2007

(65) Prior Publication Data

US 2009/0112378 A1 Apr. 30, 2009

(51) Int. Cl.
*G01C 23/00* (2006.01)
(52) U.S. Cl. .............................. 701/3; 701/14; 701/36; 701/211; 340/945
(58) Field of Classification Search ..................... 701/3, 701/14–16, 33, 36, 211; 340/901, 945, 438, 340/439
See application file for complete search history.

(56) References Cited

U.S. PATENT DOCUMENTS 5,812,937 A * 9/1998 Takahisa et al. ............. 455/66.1
6,813,777 B1 * 11/2004 Weinberger et al. ............ 725/76

OTHER PUBLICATIONS

U.S. Appl. No. 11/927,540, filed Oct. 29, 2007, Heidi J. Kneller et al.
U.S. Appl. No. 11/927,368, filed Oct. 29, 2007, James P. Schalla et al.
U.S. Appl. No. 11/927,490, filed Oct. 29, 2007, Heidi J. Kneller et al.
U.S. Appl. No. 11/927,517, filed Oct. 29, 2007, James P. Schalla et al.
U.S. Appl. No. 11/927,394, filed Oct. 29, 2007, James P. Schalla et al.

* cited by examiner

*Primary Examiner*—Gertrude Arthur Jeanglaud
(74) *Attorney, Agent, or Firm*—Harness, Dickey & Pierce, P.L.C.

(57) ABSTRACT

A system for an interior annunciator onboard a mobile platform (such as a train, marine vessel, aircraft or automobile) is provided. The system includes at least one speaker onboard the mobile platform. The system also includes a flight management control module that generates flight management data that indicates at least one status of an operation of the mobile platform. The system further includes an auditory control module that generates nonverbal auditory data based on the at least one status of the operation of the mobile platform. The nonverbal auditory data is broadcast by the at least one speaker to communicate the at least one status of the operation of the mobile platform to at least one passenger onboard the mobile platform.

21 Claims, 6 Drawing Sheets

SYSTEM AND METHOD FOR AIRCRAFT INTERIOR ANNUNCIATOR

FIELD

The present disclosure relates generally to notification systems for passengers onboard a mobile platform, and more particularly to a system and a method for an interior annunciator for a mobile platform, such as an aircraft.

BACKGROUND

The statements in this section merely provide background information related to the present disclosure and may not constitute prior art.

Many mobile platforms (such as trains, ships, aircraft and automobiles) are required to display safety information in a conspicuous manner so that passengers may review this information and be reminded of it during voyage. For example, commercial passenger aircraft are required to display information instructing the passengers to fasten their seatbelts and remain seated during take-off, landing and times of turbulence. In addition, many mobile platforms may desire to communicate other types of information to passengers, such as the start of a food service, arrival at a destination, etc.

In order for this information to be understood by all passengers, placards may be used that include information in various languages. Alternatively, symbols might be used to convey the information to the passengers, such as a fasten seatbelt symbol. Both the use of placards and symbols are limited in that for those passengers with disabilities, it may be difficult for these passengers to see and/or read the placards and symbols. In addition, due to an increase in international travel, the placards need to be translated into various languages to enable all passengers to read and comprehend this information. This adds expense and complexity in part number management, and the excessive use of placards may also detract from the atmosphere of the aircraft.

SUMMARY

A system for an interior annunciator onboard a mobile platform is provided. The system includes at least one speaker onboard the mobile platform. The system also includes a flight management control module that generates flight management data that indicates at least one status of an operation of the mobile platform. The system further includes an auditory control module that generates nonverbal auditory data based on the at least one status of the operation of the mobile platform. The nonverbal auditory data is broadcast by the at least one speaker to communicate the at least one status of the operation of the mobile platform to at least one passenger onboard the mobile platform.

In one implementation, a method of communicating information to at least one passenger onboard a mobile platform is provided. The method includes providing at least one speaker on the mobile platform and receiving management data that includes at least one of a change in status of a door on the mobile platform, a change in a location of the mobile platform, a user input from a control center of the mobile platform and combinations thereof. The method further includes outputting via the at least one speaker an auditory data that communicates the management data to the at least one passenger. The auditory data comprises a nonverbal auditory signal.

The present teachings also provide an aircraft. The aircraft includes a fuselage that has a cockpit and a passenger cabin. The passenger cabin includes at least one speaker capable of broadcasting a nonverbal auditory signal to at least one occupant seated at least one passenger seat in the passenger cabin, with the at least one speaker controlled by an interior annunciator control system. The interior annunciator control system includes a crew control module that generates crew data based on an input from a crew member of the aircraft. The crew data includes a signal for the at least one occupant to remain seated, a signal that a service is to begin on the aircraft, a signal that indicates a change in a schedule of the flight, a signal that indicates a change in a schedule of the service onboard the aircraft and combinations thereof. The interior annunciator control system further includes an auditory control module that outputs auditory data to the at least one speaker based on the crew data. The auditory data includes the nonverbal auditory signal.

A system for an interior annunciator onboard an aircraft that includes a fuselage having a cockpit and a passenger cabin is provided. The system includes at least one speaker capable of broadcasting a nonverbal auditory signal to at least one occupant seated in at least one passenger seat in the passenger cabin. The system also includes at least one entertainment system for use by the at least one passenger that includes an auditory output capable of broadcasting a nonverbal auditory signal to at least one occupant using the at least one entertainment system. The system further includes a crew control module that generates crew data based on an input from a crew member of the aircraft. The crew data includes a signal for the at least one occupant to remain seated, a signal that a service is to begin on the aircraft, a signal that indicates a change in a schedule of the flight, and a signal that indicates a change in a schedule of the service onboard the aircraft and combinations thereof. The system further includes a flight management control module that generates flight management data that indicates at least one status of an operation of the aircraft. The flight management data includes at least one of a change in status of a door that enables the at least one passenger to enter or exit the aircraft, a descent of the aircraft, a take-off of the aircraft, a touch down of the aircraft, an arrival of the aircraft at a gate, the aircraft reaching a cruising altitude, and a user input from a cockpit of the aircraft that the at least one passenger should fasten a seatbelt associated with the at least one passenger seat and combinations thereof. The system further includes an auditory control module that outputs auditory data to the at least one speaker, the auditory output of the at least one entertainment system and combinations thereof based on the crew data, the flight management data and combinations thereof. The auditory data includes the at least one nonverbal auditory signal.

A method of communicating information to at least one passenger onboard an aircraft that includes a fuselage having a cockpit and a passenger cabin is provided. The method includes providing at least one speaker in the passenger cabin. The method also includes providing at least one passenger seat for receipt of the at least one passenger and at least one entertainment system for use by the at least one passenger onboard the mobile platform. The at least one passenger seat includes a seatbelt fastenable to restrain the at least one passenger and the at least one entertainment system includes an auditory output. The method also includes receiving at least one of: data indicative of a change in status of a door that enables the at least one passenger to enter or exit the aircraft, data indicative of a descent of the aircraft, data indicative of a take-off of the aircraft, data indicative of a touch down of the aircraft, data indicative of an arrival of the aircraft at a gate, data indicative of the aircraft reaching a cruising altitude, data that indicates that at least one passenger should fasten the seatbelt, data that indicates that a service is to begin on the aircraft, and combinations thereof. The method further includes outputting via to at least one of the at least one speaker, the auditory output of the at least one entertainment system and combinations thereof auditory data that communicates the received data to the at least one passenger, the auditory data being a nonverbal auditory signal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is not intended to limit the present disclosure, application, or uses. Although the following description is related generally to a system and method for an interior annunciator onboard a mobile platform (such as an aircraft, ship, spacecraft, train or land-based motor vehicle), it will be understood that the system and method for the interior annunciator, as described and claimed herein, may be used with any appropriate application where it would be desirable to communicate information to individuals without the use of signage, symbols, verbal or language dependent intrusive announcements, such as in an airport or train station. Therefore, it will be understood that the following discussion is not intended to limit the scope of the appended claims to only mobile platforms and mobile platform based systems.

Figure 1:
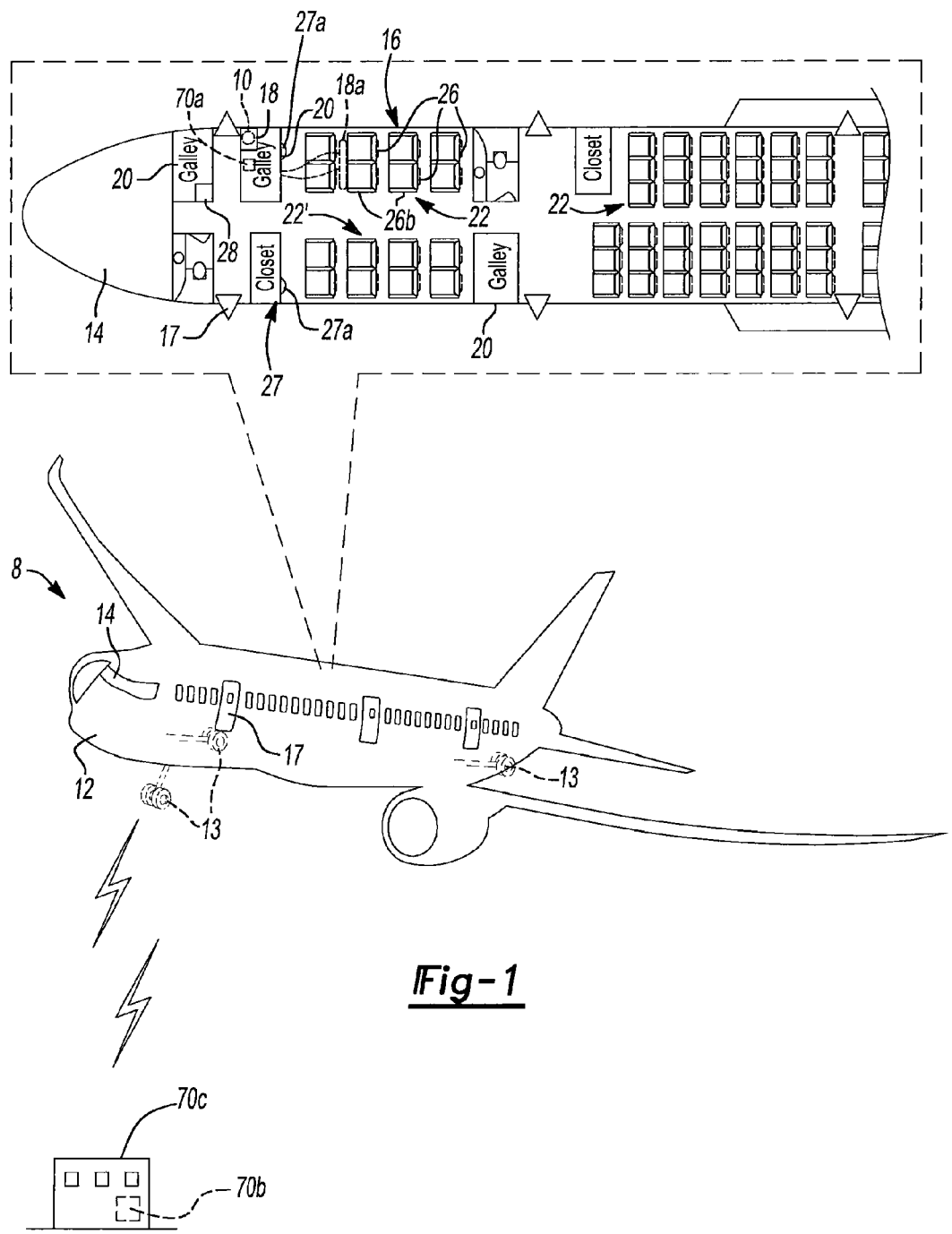
FIG. 1 is a schematic illustration of a mobile platform incorporating the system and method for an interior annunciator according to the principles of the present disclosure.
Figure 2:
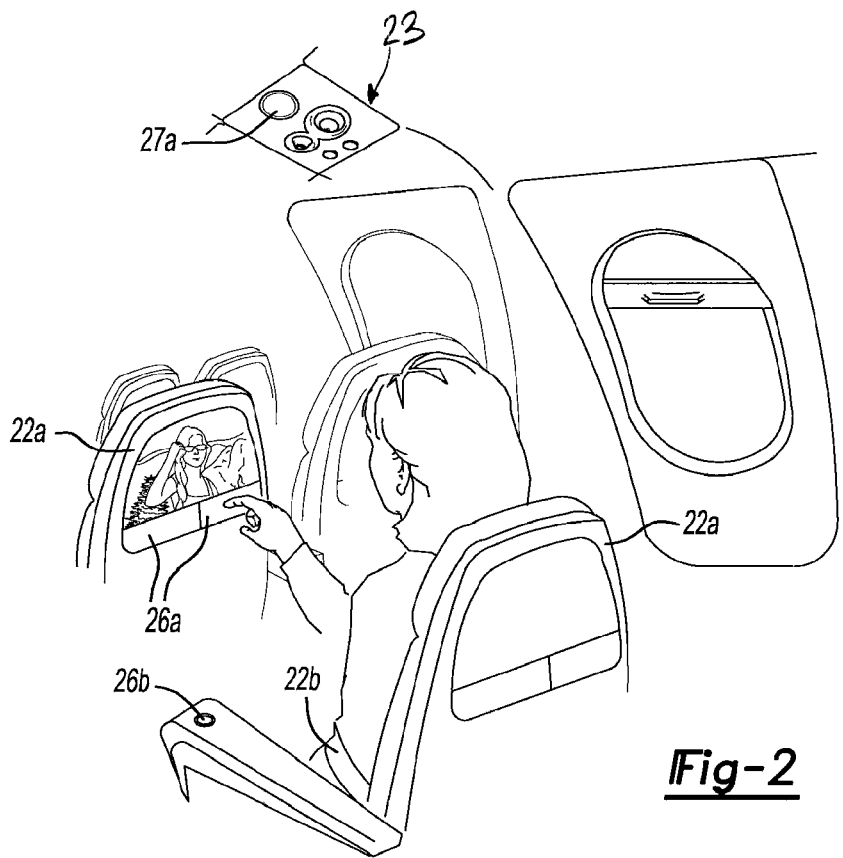
FIG. 2 is schematic illustration of a passenger onboard the mobile platform of FIG. 1 interfacing with an entertainment system.

With reference to FIGS. 1 and 2, a schematic illustrates an exemplary mobile platform that employs a system and a method for an interior annunciator that includes an interior annunciator control module 10. The mobile platform, in this example, is a passenger aircraft 8 that has a fuselage 12, which includes landing gear or wheels 13, a cockpit 14, a cabin 16, a door 17 and a controller 18. The cabin 16 includes at least one crew area 20, such as a galley, at least one passenger seat 22, a passenger service unit 23 disposed over the passenger seat 22, and an in-flight entertainment system 26 (FIG. 2). The cabin 16 may also include a communication system 27.

The crew area 20 may include a control panel 28 in communication with and responsive to the controller 18. The control panel 28 can enable the crew to interface with the interior annunciator control module 10. Thus, the control panel 28 may include at least one user input device and display means, such as a GUI for example, however, any suitable user input device and display means could be employed, such as button(s), a touch screen, a mouse, a stylus and/or a display screen. As the passenger seat 22 may comprise any suitable passenger seating surface, as generally known in the art, the passenger seat 22 will not be described in great detail herein. Briefly, however, with reference to FIG. 2, the passenger seat 22 includes a seat back 22a and a seatbelt 22b that retains the passenger during the travel of the aircraft 8. The passenger service unit 23 may be disposed over each passenger seat 22 to provide the passenger seated in the passenger seat 22 with various amenities, such as light, air flow and an attendant call feature, for example. A detailed discussion of the passenger service unit 23 is outside the scope of the present disclosure, but further detail may be found in U.S. patent application Ser. No. 11/927,517, filed Oct. 31, 2007, entitled "System and Method for Alternative Communication," hereby incorporated by reference in its entirety into the present application. The in-flight entertainment system 26 may be coupled to the seat back 22a.

The in-flight entertainment (IFE) system 26 may be responsive to and in communication with the controller 18 via a wired or wireless connection 18a (shown in phantom in FIG. 1). With reference to FIG. 2, the in-flight entertainment system 26 enables the passenger to remain occupied during the duration of the flight of the aircraft 8, as is generally known. The in-flight entertainment system 26 may include an input device 26a, such as a GUI, a touch screen, a button, a touch pen, a keyboard, a joystick, a mouse or any other suitable user input device to enable the passenger to interface with the in-flight entertainment system 26. The in-flight entertainment system 26 may also include an auditory output, such as a headphone jack 26b, to enable the user of the in-flight entertainment system 26 to couple headphones (not shown) to the headphone jack 26b to receive auditory signals generated by the interior annunciator control module 10 and/or the in-flight entertainment system 26.

With reference to FIG. 1, the communication system 27 includes one or more speakers 27a to provide auditory signals or auditory data to the occupants in the cabin 16. Generally, the speakers 27a may be coupled to the passenger service unit 23 with at least one speaker 27a for every other row of passenger seats 22 (not specifically shown), as needed, or the speakers 27a could comprise flat panel speakers, as disclosed in commonly assigned U.S. patent Ser. No. 11/229,278 and U.S. patent Ser. No. 11/196,023, each incorporated herein by reference. As the speakers 27a may be any suitable audible sound output device, as generally known, the speakers 27a will not be discussed in great detail herein. The door 17 enables passengers to enter (board) the aircraft 8 and exit (deplane) the aircraft 8. The controller 18 may comprise a computer and/or processor, and memory to hold instruction and data related to the interior annunciator control module 10.

Figure 3:
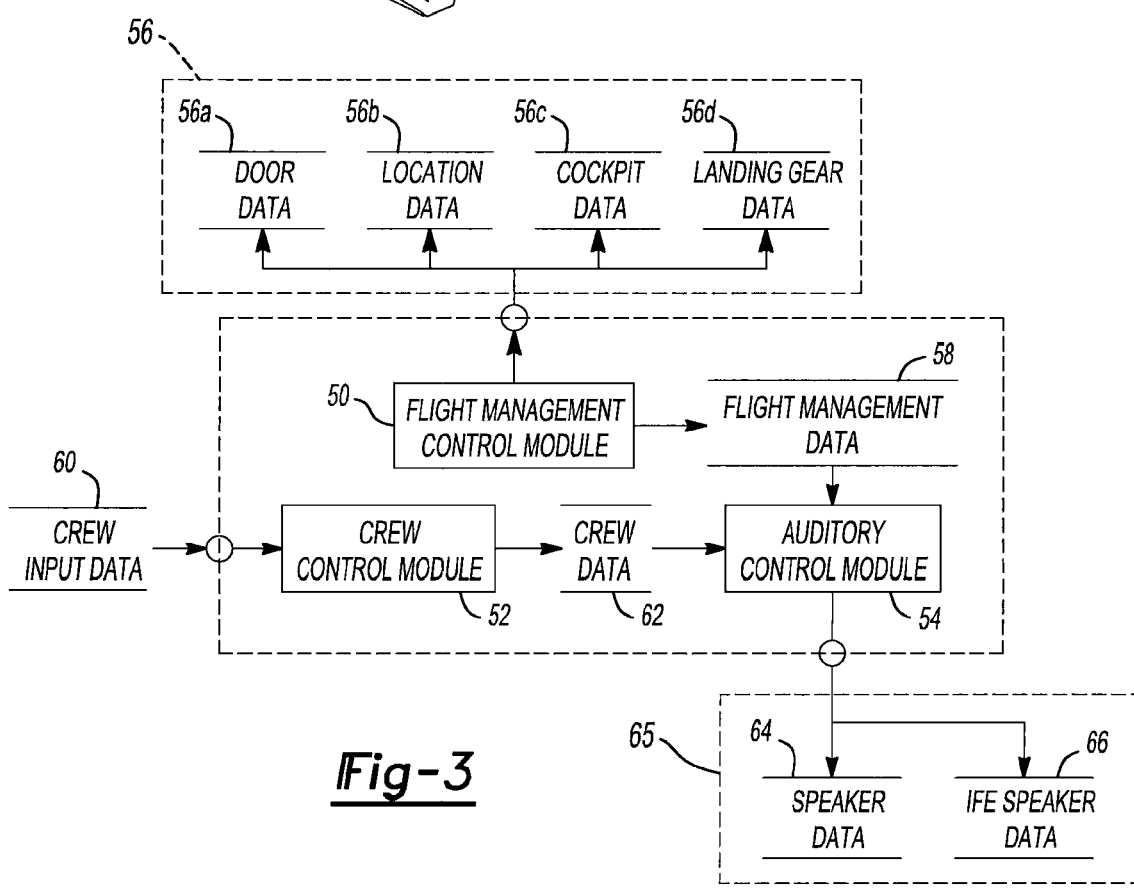
FIG. 3 is a dataflow diagram illustrating an exemplary interior annunciator control system of the present disclosure.

With reference to FIG. 3, the interior annunciator control module 10 for the aircraft 8 is illustrated in accordance with the teachings of the present disclosure. The interior annunciator control module 10 enables the passengers onboard the aircraft 8 to receive audible signals or auditory data associated with the operation of the flight of the aircraft 8. In this regard, the interior annunciator control module 10 operates to output at least one type of audible data to the passengers onboard the aircraft 8 via the headphone jack 26b of the in-flight entertainment system 26 and/or the speakers 27a in the cabin 16. The audible data comprises a nonverbal audible signal, such as a tone, chime, melody, sound byte or combinations thereof, to the user of the in-flight entertainment system 26 and/or the occupants in the cabin 16 that alerts the user and/or the occupants to a change in the status of the flight or crew operations, as will be discussed herein. Thus, the interior annunciator control module 10 may serve to alert passengers to changes in the status of the flight and crew operations on the aircraft 8 without requiring announcements from the crew onboard the aircraft 8. In addition, the interior annunciator control module 10 may communicate data regarding the operation of the aircraft 8 without requiring the use of placards, signage or symbols.

As used herein, the term "module" refers to an application specific integrated circuit (ASIC), an electronic circuit, a processor (shared, dedicated, or group) and memory that executes one or more software or firmware programs, to a combinational logic circuit, and/or to other suitable components that provide the described functionality. In FIG. 3, a dataflow diagram illustrates various components of an interior annunciator system that is embedded within the interior annunciator control module 10. Various embodiments of the interior annunciator control module 10 may include any number of sub-modules embedded within the interior annunciator control module 10. The sub-modules shown in FIG. 3 may be combined and/or further partitioned to similarly control the audible data transmitted to the passengers onboard the aircraft 8. Inputs to the interior annunciator control module 10 are received from other control modules (not shown) within the aircraft 8, and/or determined by other sub-modules (not shown) within the interior annunciator control module 10 (not shown). In FIG. 3, the interior annunciator control module 10 includes a flight management control module 50, a crew control module 52, and an auditory control module 54.

The flight management control module 50 receives as input flight management data 56. The flight management data 56 may include, without limitation, door data 56a, location data 56b, cockpit data 56c and landing gear data 56d. The door data 56a comprises data that indicates the status of the door 17 on the aircraft 8. For example, the door data 56a may indicate whether the door 17 has been moved from an "opened" position to a "closed" position, or vice versa. The location data 56b comprises data associated with the current location of the aircraft 8 on a scheduled flight plan. For example, the location data 56b may include data indicative of whether the aircraft 8 is at the gate, taxiing for takeoff, taking off from a runway of a departure airport, has reached 10,000 ft, is descending into an arrival airport, touching down on a runway at the arrival airport, or at the gate of the arrival airport.

The cockpit data 56c comprises data received from the occupant(s) of the cockpit 14. For example, the cockpit data 56c may comprise a request from the occupant(s) of the cockpit 14 that the passengers should remain seated and fasten his/her seatbelt 22b. The landing gear data 56d comprises data indicative of a status of the landing gear 13 on the aircraft 8. For example, the landing gear data 56d may comprise data that indicates if the landing gear 13 is extended from the fuselage 12 (for departure/landing/taxiing) or retracted into the fuselage 12 (on climb to/descent from a cruising altitude). The landing gear data 56d may be provided by one or more sensors associated with the wheels 13.

Based on the door data 56a, the location data 56b, the cockpit data 56c, and the landing gear data 56d, the flight management control module 50 sets flight management data 58 for the auditory control module 54. The flight management data 58 comprises data regarding the current status of the operation of the aircraft 8 such as whether the door 17 is open, the location of the aircraft 8 relative to the scheduled flight plan, whether the seatbelts 22b should be fastened, and the position of the landing gear 13 with regard to the fuselage 12.

The crew control module 52 receives as input crew input data 60. The crew input data 60 may be received from a crew member via the control panel 28 in the crew area 20. The crew input data 60 can comprise data associated with a request for the passenger to remain seated with his/her seatbelts 22b fastened and/or that a food service is about to begin in the cabin 16. The crew input data 60 may also comprise a request to associate a different auditory output with a specific operation of the crew or status of the flight. Based on the crew input data 60, the crew control module sets crew data 62 for the auditory control module 54. The crew data 62 comprises data associated with the input from the crew members via the control panel 28 such as the request for the seatbelts 22b to be fastened and/or the start of food service in the cabin 16.

The auditory control module 54 receives as input flight management data 58 from the flight management control module 50 and crew data 62 from the crew control module 52. Based on the flight management data 58 and the crew data 62, the auditory control module outputs auditory data 65. The auditory data 65 may comprise one or more audible signals transmitted as speaker data 64 and in-flight entertainment system (IFE) speaker data 66. The speaker data 64 comprises one or more nonverbal auditory signals to be broadcast by the speakers 27a of the aircraft 8. The in-flight entertainment system speaker data 66 comprises one or more nonverbal auditory signals to be broadcast to the passengers via headphones (not specifically shown) coupled to the headphone jack 26b of the in-flight entertainment system 26.

Figure 4:
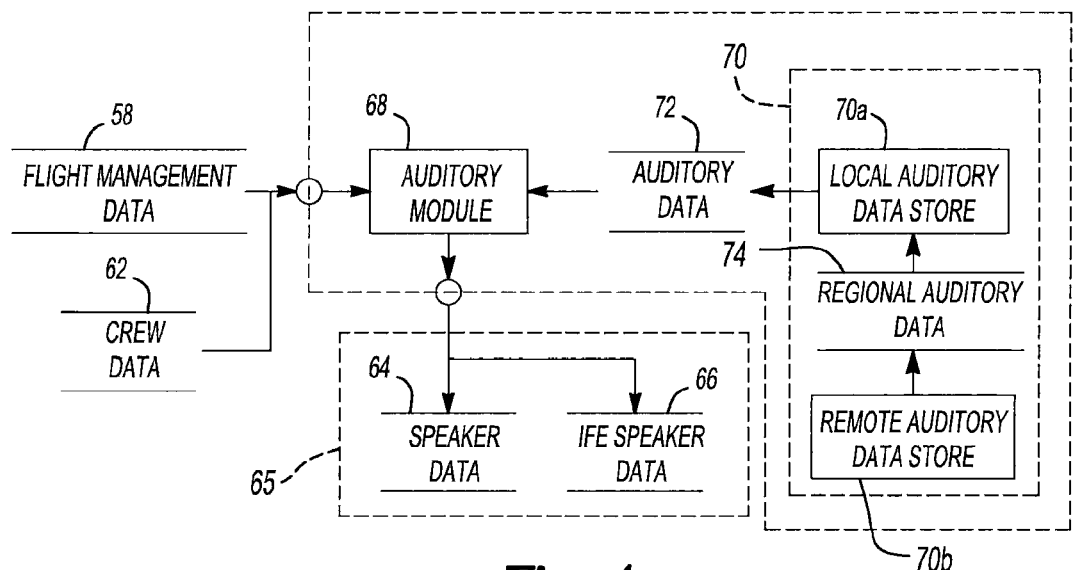
FIG. 4 is a dataflow diagram illustrating an exemplary auditory control system of the present disclosure.

With reference to FIG. 4, a dataflow diagram illustrates an exemplary auditory control system that may be embedded within the auditory control module 54. The auditory control module 54 includes an auditory module 68 and an auditory data store 70. The auditory module 68 receives as input the flight management data 58 and the crew data 62. Based on the flight management data 58 and the crew data 62, the auditory module 68 queries the auditory data store 70 for auditory data 72 that corresponds with the flight management data 58 and the crew data 62.

The auditory data store 70 may comprise a local auditory data store 70a and a remote auditory data store 70b. Both the local auditory data store 70a and the remote auditory data store 70b may comprise one or more data storage devices and may be at least one of random access memory (RAM), read only memory (ROM), a cache, a stack, or the like which may temporarily or permanently store electronic data. The local auditory data store 70a stores electronic data associated with the particular aircraft 8, and may receive regional auditory data 74 from the remote auditory data store 70b. The regional auditory data 74 may comprise auditory data or signals associated with the current global region through which the aircraft 8 is traveling. For example, sounds and signals generated by the interior control module 10 may be designed to cater to specific geographical regions and cultures. Thus, the auditory data 72 may be familiar and unique to the flight plan of the aircraft 8 Generally, the local auditory data store 70a may be located onboard the aircraft 8 (shown in phantom in FIG. 1), while the remote auditory data store 70b may be located at a ground station 70c (FIG. 1). With reference to FIG. 4, the remote auditory data store 70b may transmit the regional auditory data 74 to the aircraft 8 over a suitable wireless connection, such as through a satellite connection (not specifically shown). For example, regional auditory data 74 may be uploaded to the aircraft 8 through a ground connection (not specifically shown) during servicing or may be linked through a ground based or satellite communications system (not specifically shown).

Based on the flight management data 58 and the crew data 62, the auditory module 68 queries the auditory data store 70 for the auditory data 72, and outputs the auditory data 65. The auditory data 65 may comprise audible signals to be output to the occupants in the cabin 16 as the speaker data 64 and/or the in-flight entertainment system speaker data 66. Exemplary auditory data 65 for particular flight management data 58 and crew data 62 is shown in Table 1.

landing gear 13 has been lowered from or retracted into the fuselage 12. If the status of the landing gear 13 has changed, then the method goes to operation 101. Otherwise, if the status has not changed, then the method goes to operation 102.

At operation 102, the method determines if the status of the door 17 has changed. If the status of the door 17 has changed, such as the door 17 has moved from the "opened" position to the "closed" position, or vice versa, then the method goes to operation 101. Otherwise, the method goes to operation 103.

At operation 103, the method determines if a location of the

TABLE 1

| | Exemplary Auditory Data 65 for a Given Event | |
|---|---|---|
| Doors closed | Door auditory signal | A deep sound. For example, a deep thump sound that signals a feeling of confidence and quality, similar to the sound of an expensive car door closing. |
| Ready for takeoff | Take-off auditory signal | A very pleasant, soothing musical sound byte. For example, a melody that is associated with the starting of an adventure. The passenger is signaled that the journey on the aircraft is about to begin. |
| 10,000 ft altitude reached | Cruising auditory signal | A very pleasant musical sound byte. For example, a melody that is associated with a startup of electronic equipment. This is a signal to the passenger that they can use their electronic devices. |
| Meal service is about to begin | Food service auditory signal | A very pleasant musical sound byte. For example, a simulation of a ringing "lunch bell", or clinking silverware. This is a signal to the passenger that to think about using the bathroom and prepare for the meal service. |
| Buckle seatbelt | Seatbelt auditory signal | A somewhat intrusive sound byte that is deep and commanding. For example, the sound of a seat belt being fastened or a clip being clipped. |
| Landing gears up/ down | Landing gear auditory signal | A very pleasant musical sound byte. A sound that invokes a feeling of friendly technology. |
| Preparation for landing | Descent auditory signal | A somewhat intrusive sound byte. One example: a series of quick deep thumping sounds produced by a deep drum. A sound that is friendly, but commanding. |
| Safe and sound on the ground, taxiing to gate | Taxi auditory signal | A very pleasant, welcoming and calming musical sound byte. For example, a melody that invokes a feeling of calm satisfaction to enable the passenger to receive a signal that the journey on the aircraft is about to end. |
| Arrival at gate | Arrival auditory signal | A very pleasant, welcoming and calming musical sound byte. For example, a melody that invokes a feeling of calm satisfaction to enable the passenger to receive a signal that the journey on the aircraft has ended. |

Where the auditory data 65 may be a tone, melody, tune, sound byte, beep, bell, clang, dong, tinkle, peal, boom, gong, buzz, aria, lyric, measure, theme, or any combination thereof, and could comprise songs used under an appropriate agreement. It should be understood, that the auditory data 65 described herein is merely exemplary, and any suitable auditory output could be employed, thus, these above examples are not intended to limit the scope. Appropriate sound bytes for the auditory data 65 could also be developed and assigned to evoke specific emotional responses, such as "hunger," "calm," "thirst," etc. Thus, the auditory data 65 could be implemented based on related research in psychology, audiology, cognition, psychoanalysis, human behavior, HCI, technology, and learning theory.

Figure 5:
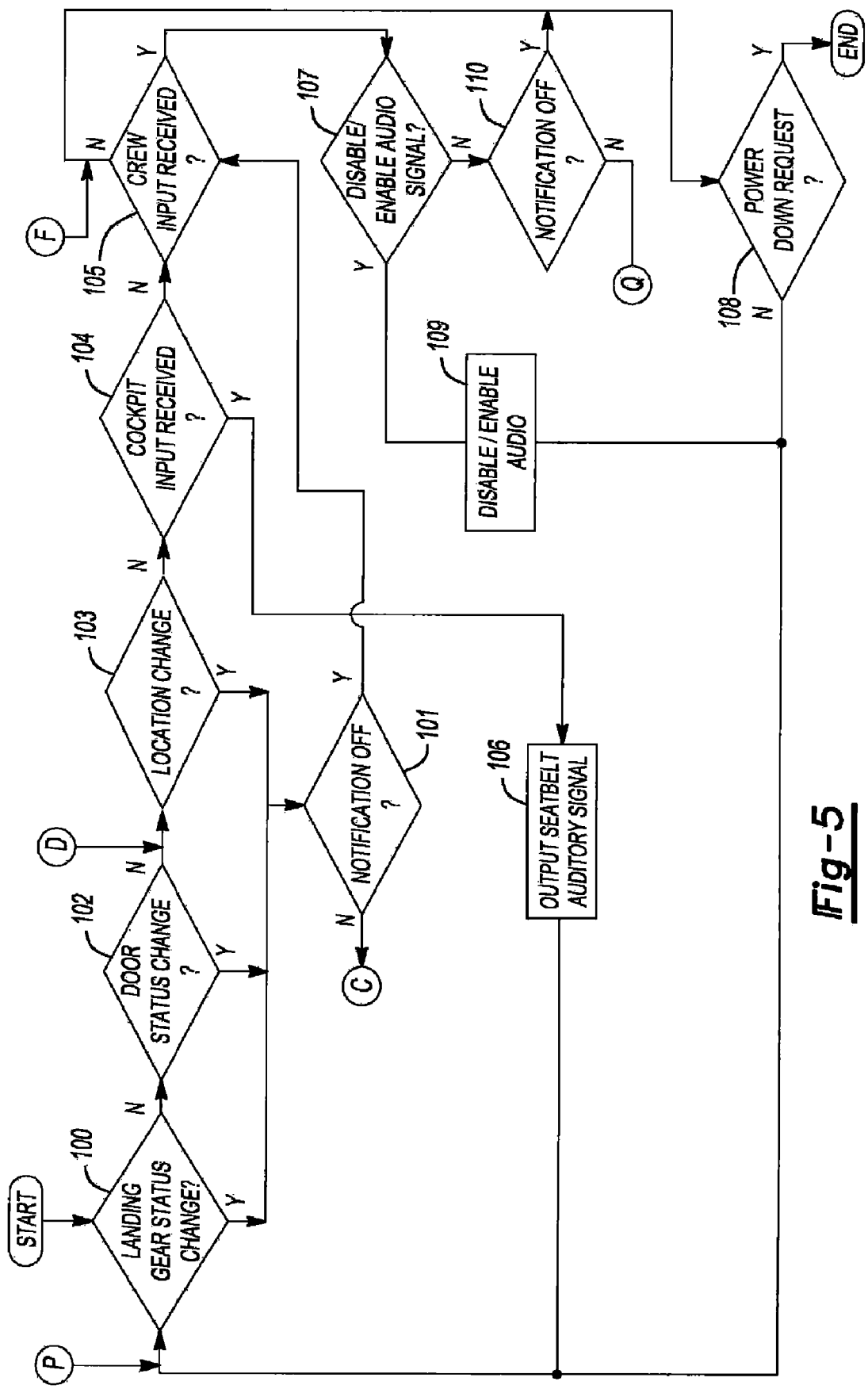
FIG. 5 is a flowchart illustrating an operational sequence for the interior annunciator control system of FIG. 3.

With reference to FIG. 5, a process flow diagram illustrates an exemplary operational sequence performed by the interior annunciator control module 10. At operation 100, the method determines if a status of the landing gear 13, such as if the aircraft 8 relative to the scheduled flight plan has changed based on the location data 56b. If the location of the aircraft 8 has not changed, then the method goes to operation 104. Otherwise, the method goes to operation 101.

At operation 101, the method determines if the interior annunciator control module 10 is enabled, such that the interior annunciator control module 10 may notify the occupants in the cabin 16 by outputting the auditory data 65. If the interior annunciator control module 10 is enabled, then the method goes to "C" on FIG. 6. If the interior annunciator control module 10 is not enabled, then the method goes to operation 104.

Figure 6:
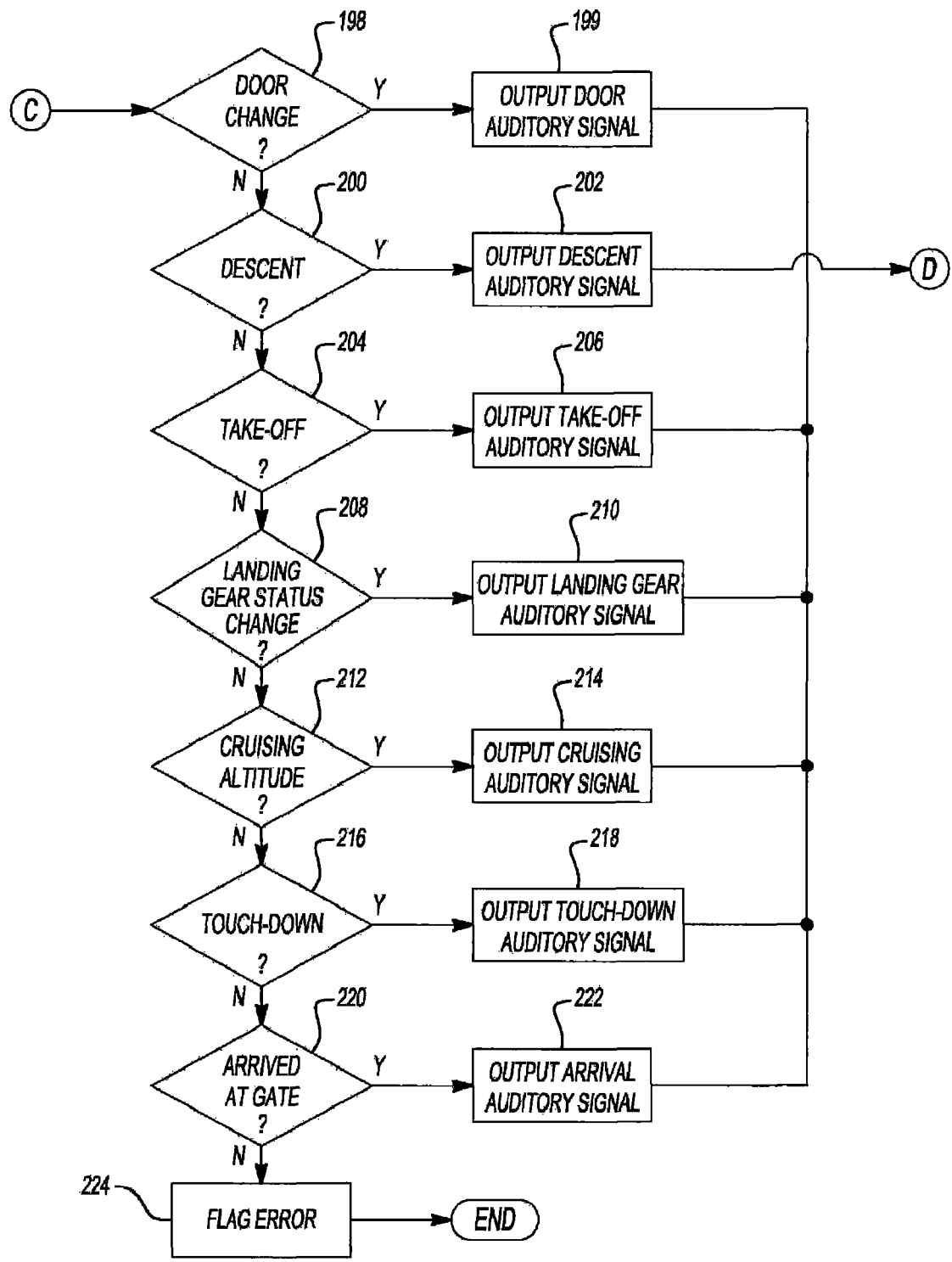
FIG. 6 is a flowchart illustrating an operational sequence for the interior annunciator control system of FIG. 3.

With reference now to FIG. 6, at operation 198, the method determines if a status of the door 17 has changed, such that the door 17 has moved from an "opened" position to a "closed" position. If the status of the door 17 has changed, then at operation 199, the method outputs a door auditory signal as auditory data 65. The door auditory signal may be output as speaker data 64 and/or in-flight entertainment system speaker data 66, and may indicate to the occupants of the cabin 16 that the door 17 of the aircraft 8 has moved from the "opened" position to the "closed" position, or vice versa. Otherwise, the method goes to operation 200.

At operation 200, the method determines if the aircraft 8 is descending into an arrival airport based on the location data 56*b*. If the aircraft 8 is descending into the arrival airport, then at operation 202, the method outputs a descent auditory signal in the form of auditory data 65. The descent auditory signal may be output as speaker data 64 and/or in-flight entertainment system speaker data 66, and may indicate to the occupants of the cabin 16 that the aircraft 8 has begun the descent into the arrival airport. Otherwise, at operation 204, the method determines if the aircraft 8 is taking off from a runway at a departing airport, based on the location data 56*b*. If the aircraft 8 is taking off from the runway, then at operation 206, the method outputs a take-off auditory signal as auditory data 65. The take-off auditory signal may be output as speaker data 64 and/or in-flight entertainment system speaker data 66, and may indicate to the occupants of the cabin 16 that the aircraft 8 has begun to take-off from the runway of the departure airport.

If the aircraft 8 is not taking off from the runway of the departure airport, then at operation 208, the method determines based on the landing gear data 56*d* if a status of the landing gear 13 has changed. If a status of the landing gear 13 has changed, then at operation 210, the method outputs a landing gear auditory signal. The landing gear auditory signal may be output as speaker data 64 and/or in-flight entertainment system speaker data 66, and may indicate to the occupants of the cabin 16 that the landing gear 13 have changed position with respect to the fuselage 12 (i.e. extended from the fuselage 12 or retracted into the fuselage 12).

At operation 212, the method determines if the aircraft 8 has reached a cruising altitude based on the location data 56*b*. If the aircraft 8 has reached a cruising altitude, then at operation 214, the method outputs a cruising altitude auditory signal as auditory data 65. The cruising altitude auditory signal may be output as speaker data 64 and/or in-flight entertainment system speaker data 66, and may indicate to the occupants of the cabin 16 that the aircraft 8 has reached a cruising altitude. Otherwise, at operation 216, the method determines if the aircraft 8 is about to touch down on a runway of the arrival airport based on the location data 56*b*. If the aircraft 8 is about to touch down, then at operation 218 the method outputs a touch down auditory signal as auditory data 65. The touch down auditory signal may indicate to the occupants of the cabin 16 that the aircraft 8 is touching down onto the runway of the arrival airport, and the touch down auditory signal may be output as speaker data 64 and/or in-flight entertainment system speaker data 66. If, in operation 216, the aircraft 8 is not touching down, then at operation 220, the method determines if the aircraft 8 has arrived at a gate of the arrival airport. If the aircraft 8 has arrived at the gate of the arrival airport, then, at operation 222, the method outputs an arrival auditory signal as auditory data 65. The arrival auditory signal may be output as speaker data 64 and/or in-flight entertainment system speaker data 66, and may indicate to the occupants of the cabin 16 that the aircraft 8 has reached the gate. The method can determine if the aircraft 8 has reached the gate based on the location data 56*b*.

After the auditory signals have been output in operations 202, 206, 210, 214, 218, and 222, the method can go to "D" on FIG. 5. If, however, at operation 222 the method determines that the aircraft 8 has not arrived at the gate, then at operation 224 the method may flag an error to indicate to members of the crew that there is a problem associated with the interior annunciator control module 10.

With reference back to FIG. 5, in operation 104 the method determines if cockpit input has been received in the form of cockpit data 56*c*. If cockpit input has been received, then, at operation 106, the method outputs a seatbelt auditory signal as auditory data 65. The seatbelt auditory signal may be output as speaker data 64 and/or in-flight entertainment system speaker data 66, and may indicate to the occupants of the cabin 16 that each passenger should be seated with his/her seatbelt properly fastened. With continued reference to FIG. 5, at operation 105, the method determines if a crew input has been received via the crew input data 60. If crew input has been received, then the method goes to operation 107. Otherwise, if crew input has not been received, then the method goes to operation 108.

At operation 107, the method determines if the crew input comprises a request to enable or disable the interior annunciator control module 10. If the crew input comprises a request to enable or disable the interior annunciator control module 10, then the method goes to operation 109. At operation 109, the method disables or enables the interior annunciator control module 10 as requested, and then loops to operation 100.

Otherwise, at operation 107, if the request does not comprise a request to enable or disable the interior annunciator control module 10, then the method goes to operation 110. At operation 110, the method determines if the interior annunciator control module 10 is enabled, such that the interior annunciator control module 10 can notify the occupants of the cabin 16 via the auditory data 65. If the interior annunciator control module 10 is enabled, then the method goes to "Q" on FIG. 7. Otherwise, the method goes to operation 108.

Figure 7:
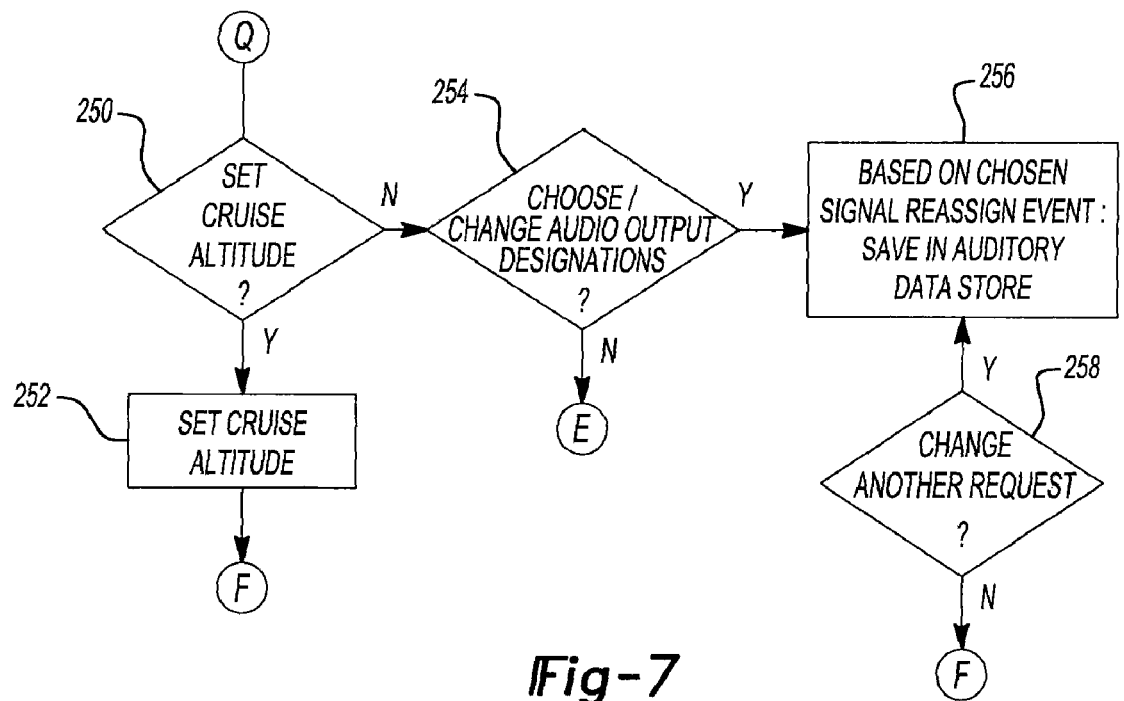
FIG. 7 is a flowchart illustrating an operational sequence for the interior annunciator control system of FIG. 3.

With reference to FIG. 7, at operation 250, the method determines if the crew input comprises a request to set a cruising altitude for the aircraft 8. If the crew input comprises a request to set the cruising altitude, then the method goes to operation 252, in which the method sets the cruising altitude based on the crew input. Then, the method goes to "F" on FIG. 5. Otherwise, if the crew input is not a request to set a cruising altitude, then the method goes to operation 254. At operation 254, the method determines if the crew input comprises a request to change or choose an auditory signal that is associated with a specific event associated with the aircraft 8. If the crew input is not a request to reassign an auditory signal, then the method goes to "E" on FIG. 8. Otherwise, the method goes to operation 256.

At operation 256, based on the selected auditory signal, the method reassigns or associates the selected auditory signal with the desired event and stores this electronic data in the auditory data store 70. Then, the method goes to operation 258, (FIG. 7) at which the method determines if the crew input comprises a request to change another one of the auditory signals. If the crew input is a request to change the auditory signals, then the method goes to operation 256. Otherwise, the method goes to "F" on FIG. 5.

Figure 8:
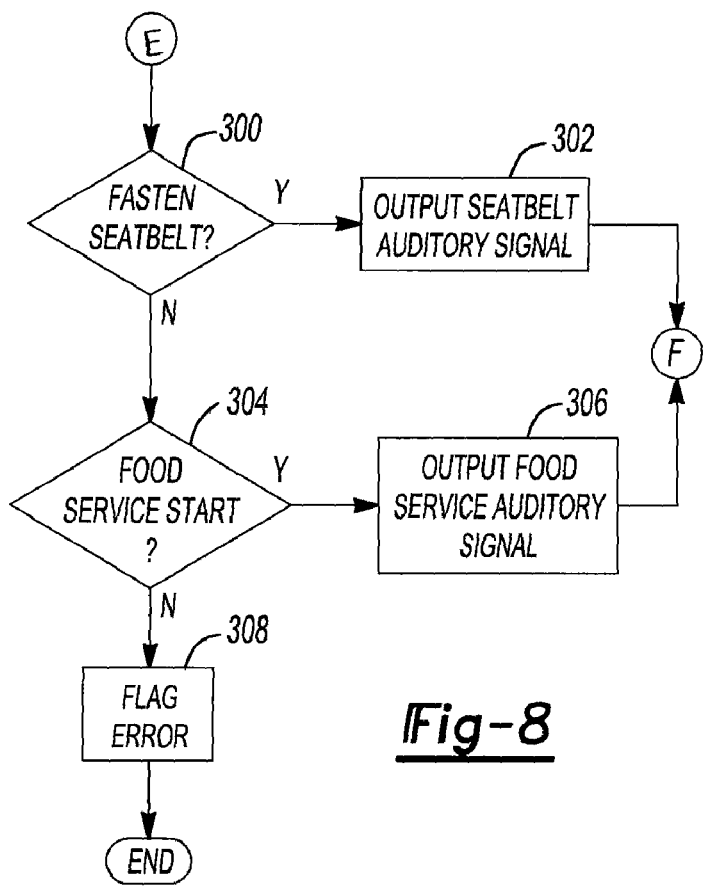
FIG. 8 is a flowchart illustrating an operational sequence for the interior annunciator control system of FIG. 3.

With reference now to FIG. 8, in operation 300 the method determines if the crew input data 60 comprises a request to fasten seatbelt. If the crew input data 60 comprises a fasten seatbelt request, then at operation 302 the method outputs the seatbelt auditory signal as auditory data 65. The seatbelt auditory signal may be output as speaker data 64 and/or in-flight entertainment system speaker data 66, and as discussed, may indicate to the occupants of the cabin 16 that each passenger should be seated with his/her seatbelt properly fastened. At operation 304, the method determines if the crew data 62 comprises a signal that a food service is about to begin. If the crew data 62 comprises an indication that the food service is about to begin, then at operation 306, the method outputs a food service auditory signal. The food service auditory signal may be output as speaker data 64 and/or in-flight entertainment system speaker data 66, and may indicate to the occupants of the cabin 16 that the food service is about to begin. Otherwise, at operation 304, if the signal does not comprise a signal that food service is about to begin, then the method flags an error at operation 308. After operation 302 and operation 306, the method goes to "F" on FIG. 5.

With reference back to FIG. 5, at operation 108, the method determines if a power down request has been received. If a power down request has been received, then the method ends. Otherwise, the method loops to operation 100.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A system for an interior annunciator onboard a mobile platform comprising:
    at least one speaker onboard the mobile platform;
    a flight management control module that generates flight management data that indicates at least one status of an operation of the mobile platform; and
    an auditory control module that generates nonverbal auditory data based on the at least one status of the operation of the mobile platform, the nonverbal auditory data broadcast by the at least one speaker to communicate the at least one status of the operation of the mobile platform to at least one passenger onboard the mobile platform.

2. The system of claim 1, wherein the mobile platform further comprises an aircraft that includes a passenger cabin with at least one passenger seat for receipt of the at least one passenger and at least one entertainment system for use by the at least one passenger onboard the mobile platform, the at least one passenger seat including a seatbelt fastenable to restrain the at least one passenger and the at least one entertainment system including an auditory output.

3. The system of claim 2, wherein the at least one speaker further comprises at least one speaker mounted in the passenger cabin of the mobile platform, the auditory output of the at least one entertainment system and combinations thereof.

4. The system of claim 3, wherein the flight management data comprises at least one of a change in status of a door that enables the at least one passenger to enter or exit the aircraft, a change in a location of the aircraft, a user input from a cockpit of the aircraft that the at least one passenger should fasten the seatbelt and combinations thereof.

5. The system of claim 4, further comprising:
    a crew control module that generates crew data based on an input from a crew member of the aircraft, the crew data including a signal for the at least one passenger to fasten the seatbelt, a signal that a service is to begin on the aircraft and combinations thereof; and
    wherein the auditory control module outputs the auditory data based on the crew data, the flight management data and combinations thereof.

6. The system of claim 4, wherein the change in the location of the aircraft comprises a descent of the aircraft, a take-off of the aircraft, a touch down of the aircraft, an arrival of the aircraft at a gate, the aircraft reaching a cruising altitude and combinations thereof.

7. The system of claim 5, wherein the auditory data further comprises a tone, a chime, a melody and combinations thereof.

8. A method of communicating information to at least one passenger onboard a mobile platform comprising:
    providing at least one speaker on the mobile platform;
    receiving management data that includes at least one of a change in status of a door on the mobile platform, a change in a location of the mobile platform, a user input from a control center of the mobile platform and combinations thereof; and
    outputting via the at least one speaker auditory data that communicates the management data to the at least one passenger, the auditory data being a nonverbal auditory signal.

9. The method of claim 8, further comprising:
    providing an aircraft that includes a passenger cabin with at least one passenger seat for receipt of the at least one passenger and at least one entertainment system for use by the at least one passenger onboard the mobile platform, the at least one passenger seat including a seatbelt fastenable to restrain the at least one passenger and the at least one entertainment system including an auditory output; and
    outputting the nonverbal auditory signal to at least one of the at least one speaker, the auditory output of the at least one entertainment system and combinations thereof.

10. The method of claim 9, wherein receiving management data further comprises:
    receiving data indicative of at least one of a change in status of a door that enables the at least one passenger to enter or exit the aircraft;
    receiving data indicative of a change in a location of the aircraft;
    receiving data indicative of a user input from a cockpit of the aircraft that the at least one passenger should fasten the seatbelt; and
    receiving combinations thereof.

11. The method of claim 10, further comprising:
    receiving crew data based on an input from a crew member of the aircraft; and
    outputting the nonverbal auditory data based on the crew data, the management data and combinations thereof.

12. The method of claim 11, wherein receiving the crew data further comprises:
    receiving data that indicates that at least one passenger should fasten the seatbelt;
    receiving data that indicates that a service is to begin on the aircraft; and
    receiving combinations thereof.

13. The method of claim 10, wherein receiving data indicative of the change in the location of the aircraft further comprises:
receiving data indicative of a descent of the aircraft;
receiving data indicative of a take-off of the aircraft;
receiving data indicative of a touch down of the aircraft;
receiving data indicative of an arrival of the aircraft at a gate;
receiving data indicative of the aircraft reaching a cruising altitude; and
receiving combinations thereof.

14. The method of claim 9, wherein the nonverbal auditory signal further comprises a tone, a chime, a melody and combinations thereof.

15. An aircraft comprising:
a fuselage that includes a cockpit and a passenger cabin, the passenger cabin including at least one speaker capable of broadcasting a nonverbal auditory signal to at least one occupant seated in at least one passenger seat in the passenger cabin, with the at least one speaker controlled by an interior annunciator control system including:
a crew control module that generates crew data based on an input from a crew member of the aircraft, the crew data including a signal for the at least one occupant to remain seated, a signal that a service is to begin on the aircraft, a signal that indicates a change in a schedule of the flight, a signal that indicates a change in a schedule of the service onboard the aircraft and combinations thereof; and
an auditory control module that outputs auditory data to the at least one speaker based on the crew data, the auditory data including the at least one nonverbal auditory signal.

16. The aircraft of claim 15, wherein the passenger cabin further comprises at least one entertainment system for use by the at least one passenger that includes an auditory output, and the at least one nonverbal auditory signal is output to the at least one speaker in the passenger cabin, the auditory output of the at least one entertainment system and combinations thereof.

17. The aircraft of claim 16, further comprising:
a flight management control module that generates flight management data that indicates at least one status of an operation of the mobile platform, the flight management data including at least one of a change in status of a door that enables the at least one passenger to enter or exit the aircraft, a change in a location of the aircraft, a user input from a cockpit of the aircraft that the at least one passenger should fasten a seatbelt associated with the at least one passenger seat and combinations thereof; and
wherein the auditory control module outputs the auditory data based on the crew data, the flight management data and combinations thereof.

18. The aircraft of claim 17, wherein the change in location of the aircraft comprises a descent of the aircraft, a take-off of the aircraft, a touch down of the aircraft, an arrival of the aircraft at a gate, the aircraft reaching a cruising altitude and combinations thereof.

19. The aircraft of claim 17, wherein the auditory data further comprises a tone, a chime, a melody and combinations thereof.

20. A system for an interior annunciator onboard an aircraft that includes a fuselage having a cockpit and a passenger cabin comprising:
at least one speaker capable of broadcasting a nonverbal auditory signal to at least one occupant seated in at least one passenger seat in the passenger cabin;
at least one entertainment system for use by the at least one passenger that includes an auditory output capable of broadcasting a nonverbal auditory signal to at least one occupant using the at least one entertainment system;
a crew control module that generates crew data based on an input from a crew member of the aircraft, the crew data including a signal for the at least one occupant to remain seated, a signal that a service is to begin on the aircraft, a signal that indicates a change in a schedule of the flight, a signal that indicates a change in a schedule of the service onboard the aircraft and combinations thereof;
a flight management control module that generates flight management data that indicates at least one status of an operation of the mobile platform, the flight management data including at least one of a change in status of a door that enables the at least one passenger to enter or exit the aircraft, a descent of the aircraft, a take-off of the aircraft, a touch down of the aircraft, an arrival of the aircraft at a gate, the aircraft reaching a cruising altitude, a user input from a cockpit of the aircraft that the at least one passenger should fasten a seatbelt associated with the at least one passenger seat and combinations thereof; and
an auditory control module that outputs auditory data to the at least one speaker, the auditory output of the at least one entertainment system and combinations thereof based on the crew data, the flight management data and combinations thereof, the auditory data including the at least one nonverbal auditory signal.

21. A method of communicating information to at least one passenger onboard an aircraft that includes a fuselage having a cockpit and a passenger cabin comprising:
providing at least one speaker in the passenger cabin;
providing at least one passenger seat for receipt of the at least one passenger and at least one entertainment system for use by the at least one passenger onboard the aircraft, the at least one passenger seat including a seatbelt fastenable to restrain the at least one passenger and the at least one entertainment system including an auditory output;
receiving at least one of:
data indicative of a change in status of a door that enables the at least one passenger to enter or exit the aircraft;
data indicative of a descent of the aircraft;
data indicative of a take-off of the aircraft;
data indicative of a touch down of the aircraft;
data indicative of an arrival of the aircraft at a gate;
data indicative of the aircraft reaching a cruising altitude
data that indicates that at least one passenger should fasten the seatbelt;
data that indicates that a service is to begin on the aircraft; and
combinations thereof;
outputting via to at least one of the at least one speaker, the auditory output of the at least one entertainment system and combinations thereof auditory data that communicates the received data to the at least one passenger, the auditory data being a nonverbal auditory signal.

* * * * *